United States Patent [19]

Butterfield

[11] Patent Number: 5,096,368
[45] Date of Patent: Mar. 17, 1992

[54] METHOD FOR STORING AND TRANSPORTING STACKS OF FLEXIBLE SHEETS

[76] Inventor: Floyd S. Butterfield, 721 Shannon Hill Dr., Paso Robles, Calif. 93446

[21] Appl. No.: 403,036

[22] Filed: Aug. 28, 1989

Related U.S. Application Data

[63] Continuation of Ser. No. 123,177, Nov. 20, 1987, abandoned.

[51] Int. Cl.$^5$ .............................................. B65G 57/00
[52] U.S. Cl. ...................................... 414/786; 206/449; 206/554; 206/555; 211/50; 229/122; 414/416; 414/425; 414/789.9; 414/923
[58] Field of Search ................ 53/249, 390; 206/449, 206/499, 554, 555; 211/49.1, 50; 220/1 T, 83, 1.5, 4 R; 271/207; 414/789.9, 790.8, 403, 416, 417, 425, 786, 923; 229/122, 122.2

[56] References Cited

U.S. PATENT DOCUMENTS

| Re. 26,663 | 9/1969 | Dwyer, Jr. | 229/122 X |
|---|---|---|---|
| 2,932,389 | 4/1960 | Pearson | 206/449 |
| 3,002,651 | 10/1961 | Gauld | 229/122.2 X |
| 3,292,801 | 12/1966 | Walz et al. | 414/458 |
| 4,344,727 | 8/1982 | Chaloupka | 414/48 X |
| 4,750,729 | 6/1988 | Kanoto et al. | 414/43 X |

FOREIGN PATENT DOCUMENTS

| 0095574 | 12/1983 | European Pat. Off. | 271/207 |
|---|---|---|---|
| 2066219 | 7/1981 | United Kingdom | 211/50 |

Primary Examiner—Robert J. Spar
Assistant Examiner—Janice Krizek
Attorney, Agent, or Firm—Christie, Parker & Hale

[57] ABSTRACT

Sheets are stacked in a container substantially open at its front, and which has a pair of sidewalls and an upright back wall having a pair of edges each secured to a respective adjacent edge of the sidewalls. After a stack of sheets is formed within the container by depositing them through the open front of the container, the bottom of the stack or container is supported, and the supported stack and the container are lifted and moved from a first location to a second location. Because of the open front, the container can be slipped from around the stack to leave the stack standing at the second location free of the container.

1 Claim, 2 Drawing Sheets

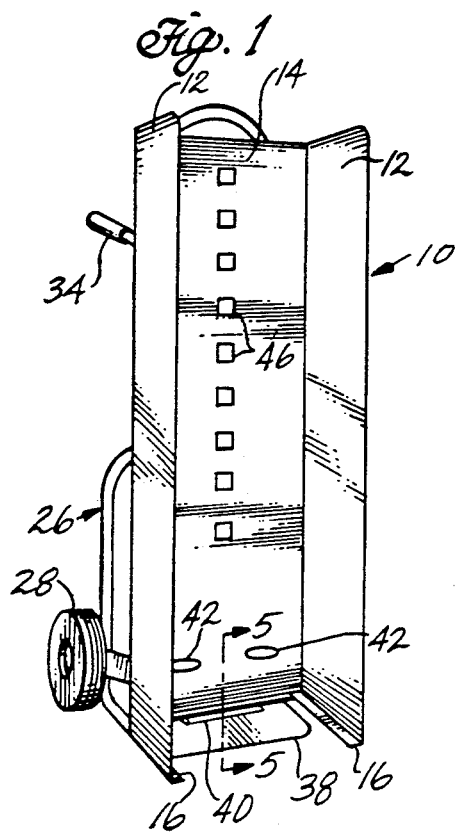
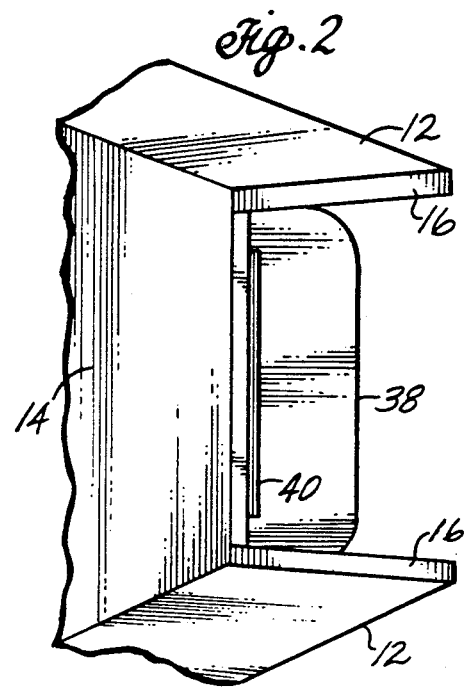
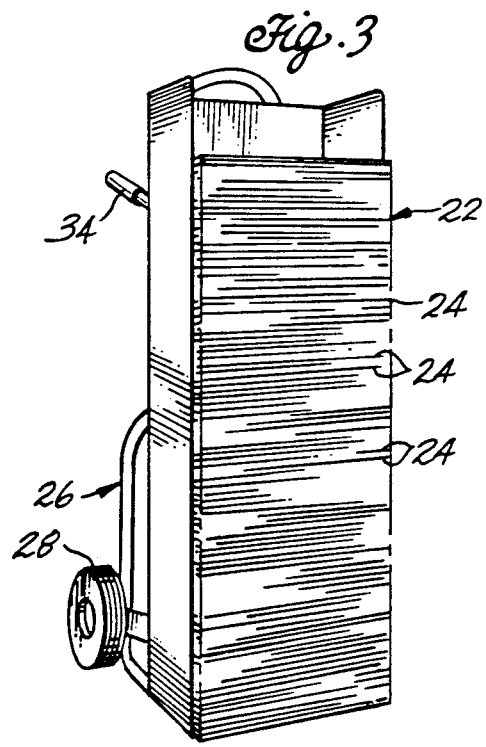
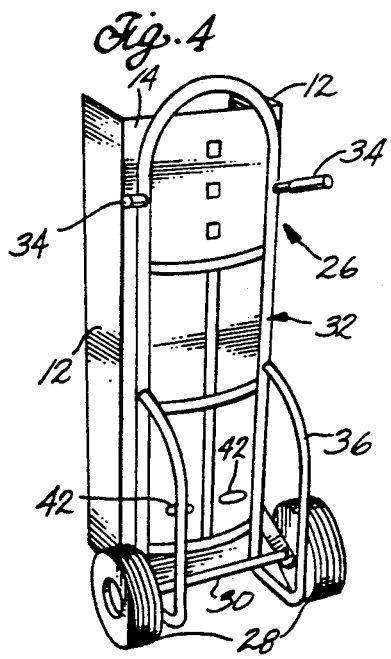

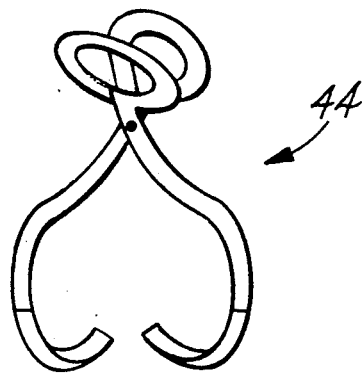
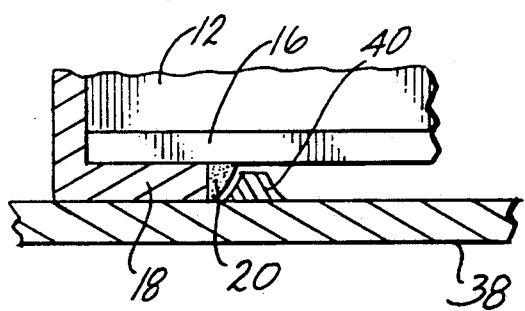

5,096,368

METHOD FOR STORING AND TRANSPORTING STACKS OF FLEXIBLE SHEETS

CROSS-REFERENCE TO RELATED APPLICATIONS

This is a continuation of application Ser. No. 07/123,177, filed Nov. 20, 1987, now abandoned.

BACKGROUND OF THE INVENTION

This invention relates to the accumulation, stacking, and transporting of material in the form of thin sheets or signatures.

Many businesses produce large quantities of sheet-like material, much of which is discarded. For example, hospitals accumulate and discard used x-ray films in the form of loose, thin sheets which contain enough silver to be economically recovered, if the sheets can be handled efficiently. Computer printers process large numbers of paper sheets, many of which are also discarded. The paper sheets are of good quality and suitable for recycling, if they can be handled efficiently. The computer paper sheets are usually folded in accordion fashion, making it difficult to stack and handle sheets efficiently.

These and many other sheet-like products with potentially good salvage value are often inefficiently handled and, therefore, discarded without any attempt at economic recovery.

SUMMARY OF THE INVENTION

This invention provides a container and method for using it to form neat, compact, high-density stacks of loose sheets, such as x-ray film and paper discharged from a computer printer, so that the stacks can easily be formed, transported, and stored in minimum space for shipment to a recycling or other processing center.

In terms of apparatus, the invention provides a container for a stack of flexible sheets of paper, film, or the like. The container comprises a pair of upright sidewalls spaced from and facing each other. An upright back wall has a pair of upright side edges each secured to a respective adjacent edge of the sidewalls. The container is substantially open at its front so that sheets of paper and the like can easily be stacked in the container, the bottom of which may be closed, but preferably is substantially open. The container is also preferably open at its top, at least during the stacking operation.

In the preferred form of the invention, the lower edge of each sidewall includes a substantially horizontal and inwardly extending lip, each having a dimension in a direction toward the opposite sidewall substantially less than about one-fourth the distance between the lips on the sidewalls. The bottom edge of the back wall also includes a substantially horizontal inwardly extending lip, which has a dimension in a direction substantially perpendicular to the major plane of the back wall about equal to that of the width of the side lips. Thus, even with the lips present, the bottom of the container is substantially open.

In other embodiments of the invention, some or all the lips can be omitted, or the bottom of the container can be completely closed. However, these embodiments are less preferred than the one which includes the relatively narrow, inwardly extending lips.

The container may be made of any suitable material, such as plastic, cardboard, or sheet metal. When sheet metal is used, the side lips are formed integrally along the bottom edge of each sidewall, and the back lip is formed integrally along the bottom edge of the back wall. Preferably, each side lip includes an end portion adjacent the back wall which rests on a respective end portion of the bottom lip, and the overlapping adjacent portions of the lips are welded together. The weld and adjacent portions of the lips are preferably ground down to a smooth, rounded surface to facilitate sliding the bottom of the container over horizontal surfaces, such as floors, carpets, and the like.

To move the stack of sheets formed in the container of this invention, I prefer to use a dolly (hand truck), which may be of conventional type, and which includes a pair of wheels mounted on a frame which carries an outwardly extending platform mounted in cantilever fashion to pivot about the axis of rotation of the dolly wheels. The dolly includes the usual handles for manipulating the dolly platform under a load.

Although the container may have a closed bottom, I have found that this is not necessary, adds to the expense of the container, and may, in some instances, make it more difficult to remove the container from the stack to leave the stack standing free of the container, say, in a truck or ocean container for shipment to a recycling or processing center.

Surprisingly, I have found that the stack of sheets and container can be easily handled with a conventional dolly, even though the bottom of the container is substantially or completely open. This has proved to be possible because a stack of sheets, say, computer print-out paper, three or four feet high is sufficiently heavy (about 200 pounds) to form a compact stack which is fairly rigid at its bottom, making it relatively easy to slip a dolly platform under the stack of papers and lift the stack and container together for transport from a first location to a second location. The back lip on the lower edge of the container is especially useful in facilitating insertion of the dolly platform under the edge of the paper stack adjacent the back wall. The side lips also facilitate maneuvering the dolly platform into the proper lifting position, and also add strength and rigidity to the container, especially in a sheet metal container with the adjacent portions of the lips welded to each other.

I have also found it useful to include a relatively short transverse ridge on the upper surface of the platform to engage the inner face of the lower edge of the back wall (or lip on that edge) of the container so that, when the dolly is pulled away from a paper stack which has been moved to a storage location, the ridge urges the container to move away from the stack as the dolly is retracted, leaving the stack of paper sheets standing free of the container. In another form, the back wall of the container may include openings to receive hooks or the like to facilitate pulling the container away from a stack. The transverse ridge on the upper surface of the dolly platform can also be used in conjunction with the holes and hooks to facilitate removal of the container from a stack. The rib and/or the openings for pulling hooks are particularly useful when a number of stacks are stored almost touching at their side edges, making it difficult to withdraw the container if the platform ridge and/or holes and hooks are not used.

Disposable containers can be made of cardboard, which are simply left around the stacks of paper sheets for shipment to a recycling center for recycling with the sheets of paper.

In terms of methods for storing and transporting sheets, one method of the invention includes the steps of stacking the sheets in a container at a first location. The container has a pair of upright sidewalls spaced from each other and an upright back wall with a pair of upright side edges each secured to a respective adjacent edge of the sidewalls. The container is substantially open at its front to facilitate stacking sheets in it. After a stack of sheets is formed of the desired height, the bottom of the stack and container are supported and lifted together. The stack and the container are then moved together from the first location to a second location, such as a truck or shipping container.

Preferably, the bottom of the container is substantially open to save material and to facilitate removal of the container, when desired, by slipping the container from the stack to leave the stack standing free of the container.

In the preferred method, the container and stack of sheets are supported by slipping a dolly platform under them while the stack is in a container with a substantially open bottom. The dolly platform is used to lift the stack and container to move them both from a first location to a second. Thereafter, the container is preferably slipped in a horizontal direction away from its open side to leave the stack standing free of the container.

BRIEF DESCRIPTION OF THE DRAWING

FIG. 1 is a perspective view of an empty container resting on a dolly platform;

FIG. 2 is a fragmentary perspective view looking down into the container of FIG. 1;

FIG. 3 is a perspective view showing a stack of sheets in the container of FIG. 1, and with the dolly in position to move the container and stack of sheets;

FIG. 4 is a perspective rear view of the container on a dolly for transport;

FIG. 5 is a view taken on line 5—5 of FIG. 1 showing in detail the dolly platform disposed under the lower edge of the back wall; and FIG. 6 is a view of tongs which can be used as hooks to pull the container away from the stack of sheets in it.

DESCRIPTION OF SPECIFIC EMBODIMENTS

Referring to FIG. 1, a container 10 includes a pair of upright, rectangular sidewalls 12 joined at their respective rear edges to respective opposite edges of an upright, rectangular back wall 14, which is of substantially the same height as the two sidewalls.

A separate inwardly extending, horizontal side lip 16 is formed integrally with each respective lower edge of the sidewalls. An inwardly extending horizontal back lip 18 is formed integrally with the lower edge of the back wall.

As shown best in FIGS. 2 and 5, the respective ends of the side lips adjacent the back wall each overlie a respective end of the back lip adjacent a respective side wall. The forward edge of each end of the back lip is bonded by a weld 20 to the adjacent undersurface of the overlying end of the respective side lip. Preferably, the weld and lower edges of the lips are rounded (say, by grinding) to facilitate sliding the container over a supporting surface, such as a floor or carpet.

The container can be of any suitable size and material. I have used 18-gauge sheet metal to build a container as just described, and designed to hold a four-foot stack (approximately 200 pounds) of computer printer paper. The container was 48 inches tall, 15.5 inches wide, and 10.25 inches deep. The container bottom had inwardly extending side lips and a back lip, as shown in FIGS. 1 and 2. Each lip was substantially the same length as the lower edge of the respective wall to which the lip was attached, and each lip had a width (extending into the container) of 0.75 inch. Thus, the total area of the bottom of the container was about 159 square inches, and the combined area of the lips extending into the bottom of the container was only about 27 square inches, or only about 17% of the total area of the container bottom. In its preferred form, the container bottom is at least 50% open area.

As shown in FIG. 3, the container just described is used by forming a stack 22 of individual sheets 24 of paper, film, or the like. The stacked material can be any suitable product adapted to fit within the container. An important use of the container is to hold paper sheets from computer printers or sheets of x-ray film. Computer paper sheets are normally joined at adjacent edges and folded in accordion fashion for stacking. Once a stack of computer paper is formed to a height of about four feet, the stack weighs about 200 pounds, and the bottom portion of the stack is substantially compressed and fairly rigid so that the stack and container (even with an open bottom) can easily be lifted with a conventional dolly (hand truck) 26, which includes the usual pair of wheels 28 mounted on a horizontal axis 30, which carries a conventional frame 32. A separate rearwardly and outwardly extending upper handle 34 is mounted on each side of the upper portion of the frame. A separate rearwardly extending bar handle 36 is welded to each side of the lower and rear portions of the frame. The usual forwardly extending horizontal platform 38 is secured to the lower end of the frame so that the platform can be inserted under the container and stack of papers, as shown in FIG. 3, so that the platform is disposed between adjacent sidewalls, as shown in FIGS. 1 and 2. The horizontal area of the platform (when inserted in the lifting position shown in FIG. 3) under the load can be substantially less than the total area of the container bottom, and preferably is no more than about one-half the area of the container bottom to facilitate withdrawal when the dolly and container are removed from the stack.

Referring to FIGS. 1 and 5, an upwardly extending transverse rib 40 is secured to the upper surface of the platform nearer to the rear edge of the platform than the forward edge so that, when the platform is inserted under the stack of papers and between the sidewalls as shown in FIGS. 1-5, the rib 40 is substantially parallel to the lower edge of the rear wall and forced under and past the forward edge of the rear lip 18. The length of the elongated rib is substantially less than the distance between the inner edges of side lips so that the rib will not engage the underside of either side lip.

To transport the stack and container from one location to another, the dolly platform is moved to the position shown in FIGS. 1-5. If necessary, the container is rocked slightly forward to lift the lower edge of the rear wall to permit the dolly platform and rib 40 to pass under the lower edge of the rear wall. As can be appreciated from FIG. 5, having the rear lip under the side lips facilitates insertion of the platform under the container and the stack. The upper end of the dolly frame is then tilted back toward the operator to balance the load over the axle 30, and the container and stack of sheets are moved to a second location and lowered to rest on a supporting surface at that location, say, in a truck, trailer, or ocean container (none shown) for shipment to a processing or paper recycling facility.

If the container is not to be shipped with the stack of paper sheets, the container is removed from the stack in the second location by pulling on the lower handles of the dolly so that the transverse rib 40 engages the forward edge of the bottom lip on the container rear wall and forces the lips at the lower end of the container to slide out from under the stack, which remains in a fixed position because much of the stack rests directly on the supporting surface of the second location. The reason for this is that the lips and dolly platform do not cover a substantial portion of the bottom of the container, so that the stack is forced by its weight down into direct contact with the supporting surface.

In an alternate embodiment and method, the rib on the dolly platform may be omitted, and the back wall provided with a pair of openings 42 (FIGS. 1 and 4) through its lower portion to receive the hook ends of a pair of tongs 44 (FIG. 6), or other suitable hook and handle arrangement, so that the tongs can be used to pull the container from the stack, causing the lips to slide from under the stack and leave the stack standing free of the container.

In another embodiment, both the hooks and the dolly platform rib can be used simultaneously. If desired, rearwardly extending handles can be mounted on the back surface of the back wall or near the openings 42 to assist in pulling the container from the stack.

Sometimes the stacked sheets include confidential subject matter. In such cases, the user of the container may want the sheets covered, or secured from inspection, until such time as they are actually shipped to a processing or paper recycling facility. To that end, various types of tapes and covers can be disposed over or around the container and the sheets, and sealed to prevent removal of the sheets, except by breaking the seal, which would, of course, indicate a violation of the required security.

As shown in FIGS. 1 and 4, the back wall may also include a vertical series of vertically elongated sight slots 46, which permit instant inspection to determine the approximate height of a stack within a container stored with its open face against a wall or other containers or stacks.

I claim:

1. A method for storing and transporting material in the form of flexible sheets, the method comprising the steps of:

forming a stack of the sheets in an upright container on a first supporting surface so at least one edge of the stack rests in a substantially horizontal plane on a substantially horizontal member secured to the container so as to be substantially flush with the first supporting surface when the container rests on the first supporting surface;

inserting a platform under the stack and the member;

lifting the stack, the member, and the container with the platform from the first supporting surface;

moving the stack, member, and container to a second supporting surface;

lowering the platform, stack, member, and container to rest on the second supporting surface;

withdrawing the platform from under the stack; and slipping the container and member in a substantially horizontal direction from around the stack on the second supporting surface to leave the stack standing free of the container.

* * * * *